(12) United States Patent
Walls et al.

(10) Patent No.: US 11,346,488 B1
(45) Date of Patent: May 31, 2022

(54) PATCH PLUG ASSEMBLIES AND METHODS OF SEALING TUBULARS

(71) Applicants: Glenn Mitchel Walls, Madisonville, LA (US); Robert Bradley Cook, Mandeville, LA (US); Daniel Teen, Mandeville, LA (US); Paul James Wilson, Cypress, TX (US)

(72) Inventors: Glenn Mitchel Walls, Madisonville, LA (US); Robert Bradley Cook, Mandeville, LA (US); Daniel Teen, Mandeville, LA (US); Paul James Wilson, Cypress, TX (US)

(*) Notice: Subject to any disclaimer, the term of this patent is extended or adjusted under 35 U.S.C. 154(b) by 0 days.

(21) Appl. No.: 16/944,142

(22) Filed: Jul. 30, 2020

(51) Int. Cl.
| | |
|---|---|
| F16L 55/18 | (2006.01) |
| F16L 55/168 | (2006.01) |
| F16L 55/16 | (2006.01) |
| F16L 55/128 | (2006.01) |

(52) U.S. Cl.
CPC ....... *F16L 55/1683* (2013.01); *F16L 55/1283* (2013.01); *F16L 55/1612* (2013.01)

(58) Field of Classification Search
CPC .......... F16L 55/1683; F16L 55/1283; F16L 55/1612
USPC ................................ 138/97, 98, 89
See application file for complete search history.

(56) References Cited

U.S. PATENT DOCUMENTS

| | | | | |
|---|---|---|---|---|
| 2,543,954 A | * | 3/1951 | Barber ................ | F16L 55/1657 137/328 |
| 3,042,116 A | * | 7/1962 | Sharp ..................... | E21B 33/12 166/126 |
| 4,474,216 A | * | 10/1984 | Noe ........................ | F16L 55/136 138/89 |
| 4,600,036 A | * | 7/1986 | Noe ........................ | F16L 55/136 138/89 |
| 4,658,860 A | * | 4/1987 | Reaux ................ | E21B 33/1295 138/89 |
| 4,723,578 A | * | 2/1988 | Mordarski .............. | F16L 55/13 138/89 |
| 4,909,281 A | * | 3/1990 | Reaux ................. | F16L 55/1608 138/97 |
| 5,249,604 A | * | 10/1993 | Keating ................. | F16L 55/11 138/89 |
| 6,241,424 B1 | * | 6/2001 | Bath ....................... | F16L 1/26 15/104.061 |
| 6,666,276 B1 | | 12/2003 | Yokley et al. | |
| 6,883,547 B1 | * | 4/2005 | Jorgensen .............. | F16L 55/13 138/89 |
| 7,552,766 B2 | | 6/2009 | Gazewood | |

(Continued)

FOREIGN PATENT DOCUMENTS

EP       2020482 A2     5/2002

*Primary Examiner* — James F Hook
(74) *Attorney, Agent, or Firm* — Elliott Law PLLC; Douglas H. Elliott; Nathan Q. Huynh

(57) ABSTRACT

Methods of sealing tubulars are disclosed herein, which methods may include: providing a patch plug assembly that includes: a shaft; a wedge coupled to the shaft; a slip coupled to the shaft; a plug slidably coupled to the wedge; and a ferrule disposed between the wedge and the plug; pushing the slip against the tubular; pushing the plug against the ferrule after the slip is pushed against the tubular; pushing the ferrule against the wedge after the plug is pushed against the ferrule; and pushing a plug portion of the plug against an inner surface of the tubular.

20 Claims, 12 Drawing Sheets

(56) References Cited

U.S. PATENT DOCUMENTS

| | | |
|---|---|---|
| 9,624,751 B2 | 4/2017 | Hern et al. |
| 2007/0023096 A1* | 2/2007 | Buckley ............. F16L 55/1283 138/89 |

* cited by examiner

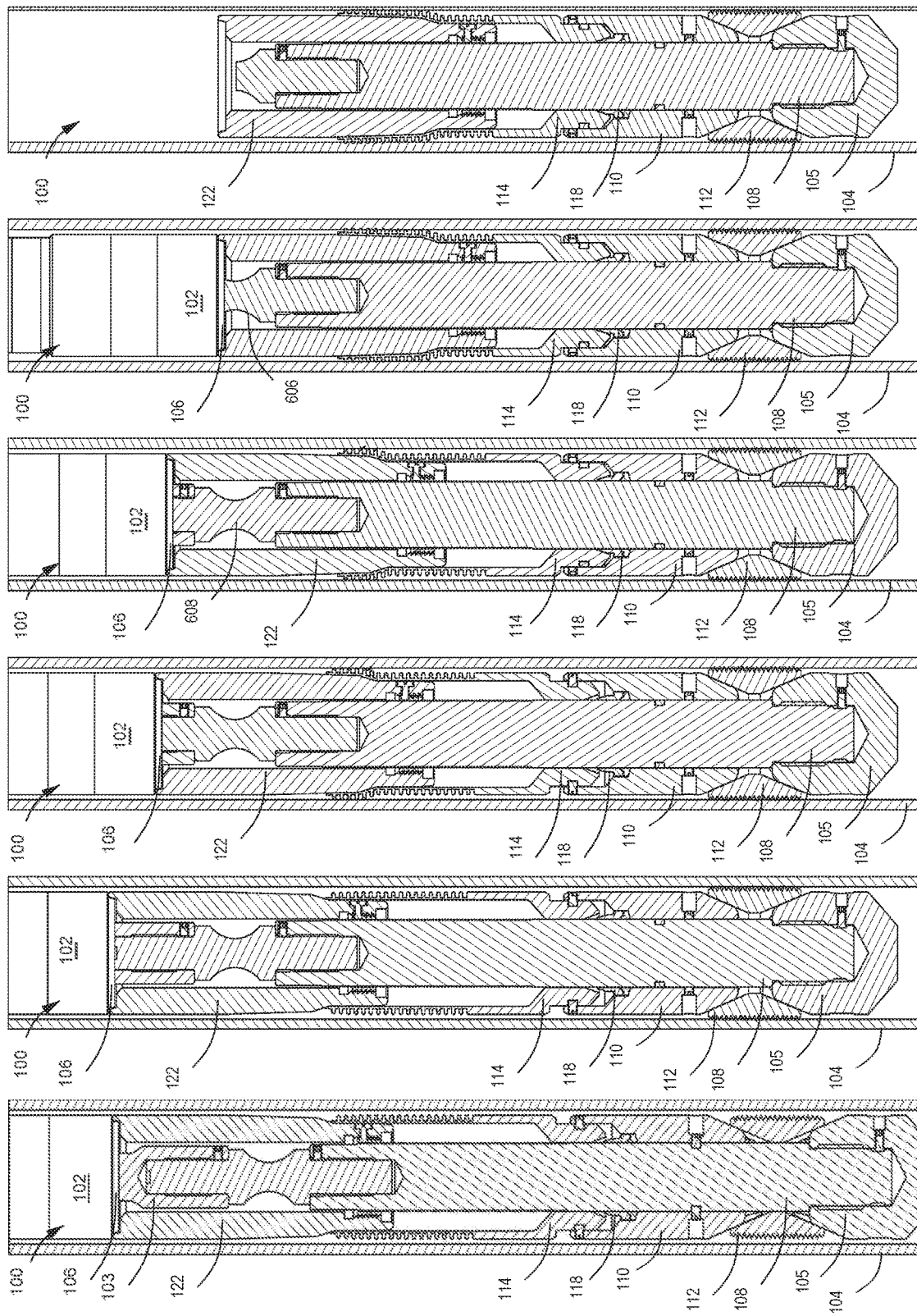

PATCH PLUG ASSEMBLIES AND METHODS OF SEALING TUBULARS

BACKGROUND

1. Field of Inventions

The field of this application and any resulting patent is patch plug assemblies and methods of sealing tubulars.

2. Description of Related Art

Various patch plug assemblies and methods of sealing tubulars have been proposed and utilized, including some of the methods and structures disclosed in some of the references appearing on the face of this application. However, those methods and structures lack the combination of steps and/or features of the methods and/or structures disclosed herein. Furthermore, it is contemplated that the methods and/or structures disclosed herein may solve certain problems that prior art methods and structures have failed to solve. Also, the methods and/or structures disclosed herein may have benefits that would be surprising and unexpected to a hypothetical person of ordinary skill with knowledge of the prior art existing as of the filing date of this application.

SUMMARY

Disclosed herein are methods of sealing tubulars, which methods may include: providing a patch plug assembly that includes: a shaft; a wedge coupled to the shaft; a slip coupled to the shaft; a plug slidably coupled to the wedge; and a ferrule disposed between the wedge and the plug; pushing the slip against the tubular; pushing the plug against the ferrule after the slip is pushed against the tubular; pushing the ferrule against the wedge after the plug is pushed against the ferrule; and pushing a plug portion of the plug against an inner surface of the tubular.

Additionally, disclosed herein are methods of sealing tubulars, which methods may include: providing a patch plug assembly that includes: a shaft; a wedge coupled to the shaft; a slip coupled to the shaft; a plug slidably coupled to the shaft, the plug having: a first protrusion having a first radius; and a second protrusion having a second radius shorter than the first radius; and a swage having a first swage surface and a second swage surface; pushing, with the wedge, the slip against the tubular; sealingly coupling the wedge to the plug; and pushing, with the first swage surface, the first protrusion and the second protrusion to share a tangent line parallel with a tubular surface of the tubular.

Also, disclosed herein are patch plug assemblies for sealing a tubular, which patch plug may include: a shaft; a wedge coupled to the shaft; a plug slidably coupled to the wedge; a ferrule disposed between the wedge and the plug, wherein the ferrule may have an upper portion capable of being sealingly coupled to the wedge and has a lower portion capable of being sealingly coupled to the plug; and a swage having a swage surface capable of pushing a plug portion of the plug against the tubular.

Further, disclosed herein are patch plug assemblies for sealing a tubular, which patch plug may include: a shaft; a wedge coupled to the shaft; a slip capable of being pushed by the wedge against the tubular; a plug slidably coupled to the shaft, the plug having: a first protrusion having a first radius; and a second protrusion having a second radius shorter than the first radius; a swage having a swage surface capable of pushing the first protrusion and the second protrusion to share a tangent line parallel to a tubular surface of the tubular.

Figure 1A:
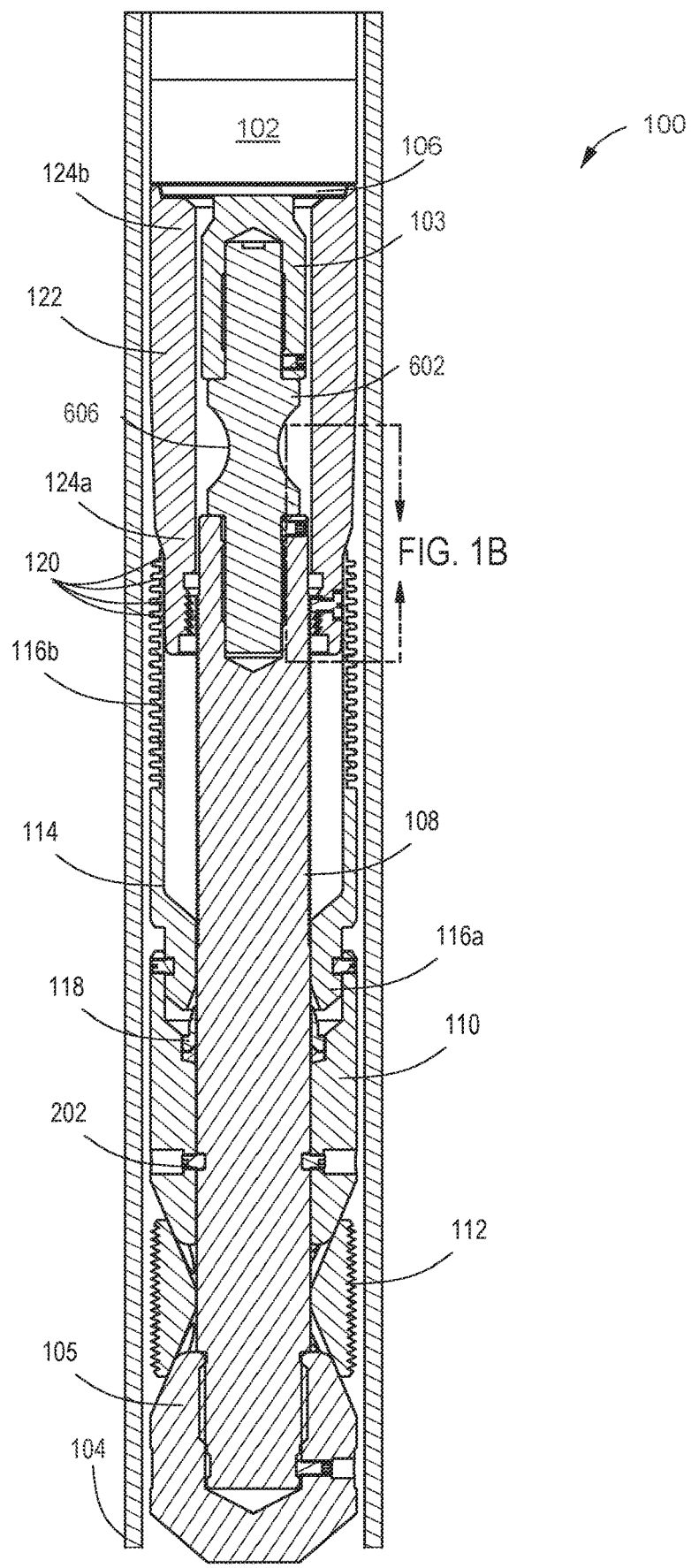
FIG. 1A illustrates a cross-sectional view of a patch plug assembly in a run-in configuration.

The views of FIGS. 7A-F illustrate a sequence of configurations to have a patch plug assembly plug a tubular.

DETAILED DESCRIPTION

1. Introduction

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references herein to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "adjacent" as used herein means next to and may include physical contact but does not require physical contact.

The term "abut against" as used herein as a verb is defined as position adjacent to and either physically touch or press against, directly or indirectly. After any abutting takes place with one object relative to another object, the objects may be fully or partially "abutted." A first object may be abutted against a second object such that the second object is limited from moving in a direction of the first object. For example, a wedge may be abutted against a surface of a slip.

The term "aligning" as used herein is a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may be extended into and/or through the apertures.

The term "aperture" as used herein is defined as any opening in a solid object including a structure such as a shaft, a stud, a swage, a wedge, a ferrule, a pipe, or other tubular. For example, an aperture may be a three-dimensional opening that begins on one side of a solid object and ends on the other side of the object, e.g., the space inside a swage, or an aperture passing through a swage wall in which is disposed a shaft. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., a shaft, a stud, a swage, a wedge, a ferrule, and/or a pin.

The term "assembly" as used herein is defined as any set of components that have been fully or partially assembled together. A group of assemblies may be coupled to form a larger assembly.

The term "coupled" as used herein is defined as directly or indirectly connected or attached. A first object may be coupled to a second object such that the first object is positioned at a specific location and orientation with respect to the second object. For example, a motor may be coupled to a cutter assembly. A first object may be either permanently, removably, shearably, slidably, threadably, pivotably, and/or fixedly coupled to a second object. Two objects are "permanently coupled," if once they are coupled, the two objects, in some cases, cannot be separated. Two objects may be "removably coupled" to each other via shear pins, threads, tape, latches, hooks, fasteners, locks, male and female connectors, clips, clamps, knots, and/or surface-to-surface contact. For example, a setting tool and patch plug assembly may be removably coupled to each other such that the setting tool may then be uncoupled and removed from the patch plug assembly. Two objects may be "shearably coupled" together, e.g., where a pin is extended through the objects and force applied to one object may break or shear the pin. For example, a pin may be extended through a shaft and a wedge, and force applied to the wedge may be transferred to the pin to cause the pin to be broken. Two objects may be "slidably coupled" where an inner aperture of one object is capable of receiving a second object. For example, a wedge coupled around a shaft may be slidably coupled to the shaft. Additionally, two objects may be capable of being "threadably coupled," e.g., where a threaded outer surface of one object is capable of being engaged with or to a threaded inner surface of another object. Threadably coupled objects may be removably coupled. Two objects may be "fixedly coupled," e.g., where the first object may be inhibited from being rotated and/or moved axially relative to the second object. For example, a shaft may be fixedly coupled to a setting tool where a portion of the shaft, in some cases, may neither be rotated nor moved axially relative to the setting tool.

The term "cylindrical" as used herein is defined as shaped like a cylinder, e.g., having straight parallel sides and a circular or oval or elliptical cross-section. Examples of a cylindrical structure or object may include a shaft, a stud, a swage, a wedge, a ferrule, and a tubular. A cylindrical object may be completely or partially shaped like a cylinder. A cylindrical object may be referred to as a "sleeve" if an aperture extends through the entire length of the cylindrical object to form a hollow cylinder capable of permitting another object, e.g., a shaft and/or a stud, to be disposed therein and/or extended through. Alternatively, a solid cylindrical object may have an inner surface and/or outer surface having a diameter that changes abruptly. A cylindrical object may have and inner or outer surface having a diameter that changes abruptly to form a collar, e.g., radial face, rim, or lip. A cylindrical object may have a collar extending toward or away from the central axis of the object. A cylindrical object may have a collar disposed on an inner surface. A cylindrical object may have a collar disposed on an outer surface. Additionally, a cylindrical object may be an object having a collar that is tapered or radiused, or a pipe with threads.

The term "deforming" as used herein is a verb that means changing in shape, e.g., by force and/or stress. After any deforming takes place, an object and/or one or more of its surfaces may be fully or partially "deformed." Deforming preferably involves pushing a first structure against a second structure to cause a surface of the second structure to deform. For example, pushing a plug against a ferrule may cause one or more surfaces of the ferrule to deform. Additionally, pushing a first structure against a second structure to cause a surface of the first structure to deform. For example, pushing a ferrule against a wedge may cause one or more surfaces of the ferrule to deform.

The term "ferrule" as used herein as is defined as a malleable, cylindrical structure configured, sized, and/or shaped for being sealingly coupled to a sleeve, e.g., plug. A ferrule may be constructed from a hard material, e.g., copper or aluminum. A ferrule may be constructed from material having a Brinell hardness value of as low as 75, 76, 78, 79, 80, 85, or 90 to as high as 111, 112, 113, 114, 115, 120, 125, 130, or higher.

The terms "first" and "second" as used herein merely differentiate two or more things or actions, and do not signify anything else, including order of importance, sequence, etc.

The term "fluid" as used herein is defined as material that is capable of being flowed. A fluid may be a liquid or a gas. Examples of a fluid may include hydrocarbon, water, drilling fluid, drilling mud, cement, lubricant, cleaning fluid, and motor oil. A fluid may include material, e.g., hydrocarbon, water, compounds, and/or elements originating from underground rock formation. A fluid can be a mixture of two or more fluids. A fluid may absorb heat. A fluid may have properties such as viscosity, anti-foaming, thermal stability, thermal conductivity, and thermal capacity. Fluid in a downhole tubular string used in driving a motor, e.g., motor, may be call "mud." A fluid may be water-based, oil-based, synthetic, or a combination of viscous materials and solid materials.

The term "motor" as used herein is defined as an assembly capable of driving movement, of an object, e.g., a setting tool and/or a piston. Movement of an object may include rotation of the object on a central axis. Movement of an object may include axial displacement of the object on a central axis.

The term "perpendicular" as used herein is defined as at an angle ranging from 850 or 88 to 92° or 95°. Two structures that are perpendicular to each other may be orthogonal and/or tangential to each other.

The term "pin" as used herein is defined as structure configured, sized, and/or shaped for disposing in an aperture or groove of another structure, e.g., for coupling two objects or inhibiting movement of an object. A pin may also be referred to as a lug. A pin may be cylindrical A pin may be cylindrical may have a tapered end. A pin may be a knob. A pin may be used to couple a shaft to wedge. A pin may be used to couple a plug to wedge.

The term "plug" as used herein as a noun is defined as a sleeve having protrusions, e.g., ribs, configured, sized, and/or shape for sealingly coupling to a structure. A plug may be constructed from material having a Brinell hardness value of as low as 210, 211, 212, 214, 215, 220, or 228 to as high as 250, 255, 260, 265, 275, 285, or higher. A plug may have a Brinell hardness value greater than that of a ferrule.

The term "pressure" as used herein is defined as any force applied to a structure or other object and can be expressed quantitatively or comparatively in terms of force per unit area. Pressure may be exerted against a surface of an object, e.g., a shaft, a stud, swage, a wedge, a ferrule, a pin, and a tubular.

The term "providing" as used herein is defined as making available, furnishing, supplying, equipping, or causing to be placed in position.

The term "pushing" as used herein is a verb is defined as applying force, e.g., towards an object or structure. Pushing may compel, e.g., urge, cause, compel, influence, force, and/or press, displacement of an object. A first object, having received force from a source, may push another object by transferring the force to the second object, directly or indirectly. For example, a swage having received force from a motor would push a wedge by transferring the force to the wedge, directly or indirectly. A first object may directly push a second object where the objects physically touched. After any pushing takes place, the object may be "pushed." A pushed object may be displaced. A pushed object may remain in its original position. An object may be pushed towards or away from another object. For example, a wedge may be pushed towards a slip.

The term "slip" as used herein as a noun is defined as a structure having a first surface that is inclined and/or tapered and a second surface having threads, e.g., teeth, for abutting against another object or structure.

The term "surface" as used herein is defined as any face and/or boundary of a structure. A surface may also refer to that flat or substantially flat area that is extended across a flat structure which may, for example, be part of a plate and an arm. A surface may also refer to any curved area that extends circumferentially around a cylindrical structure or object which may, for example, be part of a shaft, a stud, a swage, a wedge, a ferrule, a pin, and/or a tubular. A surface may have irregular contours. A surface may be formed from coupled components, e.g. a shaft, a stud, a swage, a wedge, a ferrule, a pin, and/or a tubular. Coupled components may form irregular surfaces. A plurality of surfaces may be connected to form a polygonal cross-section. An example of a polygonal cross-section may be triangular, square, rectangular, pentagonal, hexagonal, or octagonal. Socket surfaces may have socket surfaces connected to form a polygonal shape, e.g., triangular, square, rectangular, pentagonal, hexagonal, or octagonal. Socket surfaces may have curved walls connected to form a substantially polygonal shape, e.g., triangular, square, rectangular, pentagonal, hexagonal, or octagonal.

The term "tapered" as used herein is defined as becoming progressively smaller, e.g., in diameter, from a first end towards a second end. Structures that are tapered may have a profile or surface that is beveled, frustoconical, and/or conical.

The term "threaded" as used herein is defined as having threads. Threads may include one or more helical protrusions or grooves on a surface of a cylindrical object. Each full rotation of a protrusion or groove around a threaded surface of the object is referred to herein as a single "thread." A plurality of threads may be referred to as "teeth." Threads may be disposed on any cylindrical structure or object including a shaft, a stud, a swage, a wedge, a slip a ferrule, and/or a tubular. Threads formed on an inner surface of an object, e.g., tubular, may be referred to as "box threads". Threads formed on an outer surface of an object, e.g., tubular, may be referred to as "pin threads." A tubular may include a "threaded portion" wherein a section of the threaded assembly includes threads, e.g., pin threads or box threads. A threaded portion may have a diameter sized to extend through an aperture of a sleeve, a shaft, wedge, or a swage. In certain cases, a threaded portion of a first object may be removably coupled to a threaded portion of a second object.

The term "tubular" as used herein as a noun is defined as a cylindrical structure having an inner surface and an outer surface, a wall, a length greater than its width or height, two opposing ends and an opening at one or both of the ends. A tubular may have an aperture disposed therethrough. Preferably, a tubular is cylindrical. Examples of a tubular may include a pipe, a shaft, a stud, a swage, a wedge, a ferrule, and a pin. However, any or all tubulars of an assembly may have polygonal cross-sections, e.g., triangular, rectangular, pentagonal, hexagonal, or octagonal.

The term "unitary" as used herein defined as having the form of a single unit.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a shaft, a stud, a swage, a wedge, a ferrule, a pin, and/or a tubular may each have an upper end and a lower end. Additionally, a cylindrical object, e.g., a shaft, a stud, a swage, a wedge, a ferrule, a pin, and/or a tubular, may have an upper portion and a lower portion. The term "top" as used herein means in the highest position, e.g., farthest from the ground. The term "bottom" as used herein means in the lowest position, e.g., closest the ground. For example, a cylindrical object, e.g., a shaft, a stud, a swage, a wedge, a ferrule, a pin, and/or a tubular, may have a top portion and a bottom portion.

The term "wedge" as used herein as a noun is defined as a structure having inclined and/or tapered an outer surface for abutting against another object or structure.

3. Certain Specific Embodiments

Disclosed herein are methods of sealing tubulars, which methods may include: providing a patch plug assembly that includes: a shaft; a wedge coupled to the shaft; a slip coupled to the shaft; a plug slidably coupled to the wedge; and a ferrule disposed between the wedge and the plug; pushing the slip against the tubular; pushing the plug against the ferrule after the slip is pushed against the tubular; pushing the ferrule against the wedge after the plug is pushed against the ferrule; and pushing a plug portion of the plug against an inner surface of the tubular.

Additionally, disclosed herein are methods of sealing tubulars, which methods may include: providing a patch plug assembly that includes: a shaft; a wedge coupled to the shaft; a slip coupled to the shaft; a plug slidably coupled to the shaft, the plug having: a first protrusion having a first radius; and a second protrusion having a second radius shorter than the first radius; and a swage having a first swage surface and a second swage surface; pushing, with the wedge, the slip against the tubular; sealingly coupling the wedge to the plug; and pushing, with the first swage surface, the first protrusion and the second protrusion to share a tangent line parallel with a tubular surface of the tubular.

Also, disclosed herein are patch plug assemblies for sealing a tubular, which patch plug may include: a shaft; a wedge coupled to the shaft; a plug slidably coupled to the wedge; a ferrule disposed between the wedge and the plug, wherein the ferrule may have an upper portion capable of being sealingly coupled to the wedge and has a lower portion capable of being sealingly coupled to the plug; and a swage having a swage surface capable of pushing a plug portion of the plug against the tubular.

Further, disclosed herein are patch plug assemblies for sealing a tubular, which patch plug may include: a shaft; a wedge coupled to the shaft; a slip capable of being pushed by the wedge against the tubular; a plug slidably coupled to the shaft, the plug having: a first protrusion having a first radius; and a second protrusion having a second radius shorter than the first radius; a swage having a swage surface capable of pushing the first protrusion and the second protrusion to share a tangent line parallel to a tubular surface of the tubular.

In any one of the methods or structures disclosed herein, the ferrule may have one or more portions capable of being sealingly coupled to the shaft.

In any one of the methods or structures disclosed herein, the ferrule may have an upper tapered surface capable of being sealingly coupled to a lower tapered surface of the plug.

In any one of the methods or structures disclosed herein, the ferrule may have a surface capable of being deformed against a surface of the plug.

In any one of the methods or structures disclosed herein, the ferrule may have a surface capable of being deformed against a surface of the wedge.

In any one of the methods or structures disclosed herein, the ferrule may include: an upper portion having a lower tapered surface; and a lower portion having an upper tapered surface capable of being sealingly coupled to the lower tapered surface.

In any one of the structures disclosed herein, the shaft may extend through the plug, the ferrule, and the wedge.

In any one of the structures disclosed herein, the shaft may be shearably coupled to the wedge.

In any one of the structures disclosed herein, the ferrule may be slidably coupled to the shaft.

In any one of the structures disclosed herein, the wedge may be shearably coupled to the plug.

Any one of the structures disclosed herein may further include a slip disposed between the wedge and a knob of the shaft, wherein the slip may be capable of being abutted against an inner surface of the tubular.

In any one of the structures disclosed herein, the plug has: a first protrusion having a first radius; and a second protrusion having a second radius shorter than the first radius.

In any one of the structures disclosed herein, the first protrusion and the second protrusion may share a tangent line that extends at a first angle relative to the central axis of the swage.

In any one of the structures disclosed herein, the protrusion the second protrusion may be capable of being simultaneously abutted against the tubular surface.

In any one of the structures disclosed herein, the first protrusion may be capable of being sealingly coupled to the tubular surface.

In any one of the structures disclosed herein, the second protrusion is capable of being sealingly coupled to the tubular surface.

In any one of the structures disclosed herein, the swage may have a swage surface capable of pushing the first protrusion and the second protrusion against a tubular surface of the tubular.

In any one of the m structures disclosed herein: the first protrusion and the second protrusion may share a tangent line extending at a first angle relative to the central axis of the swage; and the swage surface may extend at a second angle relative to the central axis, wherein the first angle and the second angle are congruent.

Any one of the methods disclosed herein may further include deforming the ferrule against the plug after the plug is pushed against the ferrule.

Any one of the methods disclosed herein may further include sealingly coupling the ferrule to the plug is pushed against the ferrule.

Any one of the methods disclosed herein may further include deforming the ferrule against the wedge after the ferrule is pushed against the wedge.

Any one of the methods disclosed herein may further include sealingly coupling the ferrule to the wedge after the ferrule is pushed against the wedge.

Any one of the methods disclosed herein may further include sealingly coupling the ferrule to the shaft after the plug is pushed against the ferrule.

In any one of the methods or structures disclosed herein, the plug portion may be pushed outwardly with a swage.

Any one of the methods disclosed herein may further include pushing, with a swage, a first portion of the plug against the wedge and a second portion of the plug against the ferrule.

Any one of the methods disclosed herein may further include pushing a portion of the plug against an inner surface of the tubular after the ferrule, the wedge, and the plug are coupled.

Any one of the methods disclosed herein may further include: shearing a first pin coupled to the wedge and the shaft; and shearing a second pin coupled to the wedge and the plug after the first pin is broken.

In any one of the methods, a first pin coupling the wedge to the shaft may break before a second pin coupling the plug to the wedge.

In any one of the methods disclosed herein a second pin coupling the plug to the wedge may break before the plug portion is deformed.

Any one of the methods disclosed herein may further include pushing, with the second swage surface, the first protrusion and the second protrusion against the pipe surface after the first protrusion and the second protrusion are pushed by the first swage surface.

Any one of the methods disclosed herein may further include simultaneously pushing, with the second swage surface, the first protrusion and the second protrusion against the pipe surface.

Any one of the methods disclosed herein may further include deforming the first protrusion and the second protrusion against the pipe surface.

Any one of the methods disclosed herein may further include simultaneously deforming the first protrusion and the second protrusion against the pipe surface.

Any one of the methods disclosed herein may further include sealingly coupling the first protrusion against the pipe surface.

Any one of the methods disclosed herein may further include sealingly coupling the second protrusion against the pipe surface.

Any one of the methods disclosed herein may further include pushing, with the swage, a first portion of the plug against the wedge and a second portion of the plug against the ferrule.

Any one of the methods disclosed herein may further include pushing, with the swage, the first protrusion and the second protrusion so the tangent line is parallel with pipe surface after the wedge and the plug are coupled.

Any one of the methods disclosed herein may further include: shearing a first pin coupled to the wedge and the shaft; and shearing a second pin coupled to the wedge and the plug after the first pin is broken.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific versions of patch plug assemblies shown in the drawings, which relate to assemblies, elements and parts that can be part of a patch plug assembly, and methods for coupling plugs to tubulars, e.g., including drill pipes, casing, production pipes, and/or other tubulars. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

FIG. 1A illustrates a cross-sectional view of a specific type of patch plug assembly 100 in a "run-in" configuration in a tubular 104. In general, any patch plug assembly referenced herein need not have all the components shown in the particular assembly 100 but may instead have some but not all of the components. The patch plug assembly 100 is coupled to a setting tool 102. The setting tool 102 includes a rod 103 and a piston 106. The rod 103 is capable of being moved, by a motor or a gas-powered pyrotechnic charge (not shown), relative to the piston 106, e.g., in an upward direction. The piston 106 is capable of being moved, by the motor or the gas-powered pyrotechnic charge, relative to the rod 103, e.g., in a downward direction.

The rod 103 is coupled to a stud 602. The stud 602 may be coupled to a shaft 108. The shaft 108 has a knob 105 that, in the specific version depicted, has a bullnose shape. The knob 105 is disposed at an end of the shaft 108 opposite the setting tool 102.

In the particular patch plug assembly 100 depicted in the drawings, the shaft 108 extends through a swage 122, a plug 114, a ferrule 118, and a wedge 110. The shaft 108 is slidably coupled to the swage 122, the plug 114, the ferrule 118, and the wedge 110.

A slip 112 is coupled to the shaft 108, either directly or indirectly. In certain configurations, the slip 112 is in physical contact with the shaft 108, as depicted in FIG. 1A. While in other configurations, the slip 112 may not be in physical contact with the shaft 108. Although the industry often refers to them as "slips" (plural), they will be referred to herein in the singular to make it clear it is preferably a single operable structure. The slip 112 is disposed between the knob 105 and the wedge 110. The wedge 110 is shearably coupled to the shaft 108, e.g., via the shear pins 202, The wedge 110 is coupled to plug 114.

The plug 114 is a cylindrical sleeve having an aperture (e.g., a borehole) extending axially therethrough, preferably from one end of the plug 114 to the other end. The plug 114 has a lower plug portion 116a and an upper plug portion 116b. The lower plug portion 116a is disposed in an upper opening of the wedge 110. A ferrule 118 is disposed between the plug portion 116a and an upper surface of the wedge 110.

The upper plug portion 116b includes a plurality of ribs which are discussed below in greater detail.

A first swage portion 124a of a swage 122 is disposed, e.g., partially or completely, in the aperture of the plug 114. A second swage portion 124b of the swage 122 is abutted against the piston 106 of the setting tool 102.

Figure 1B:
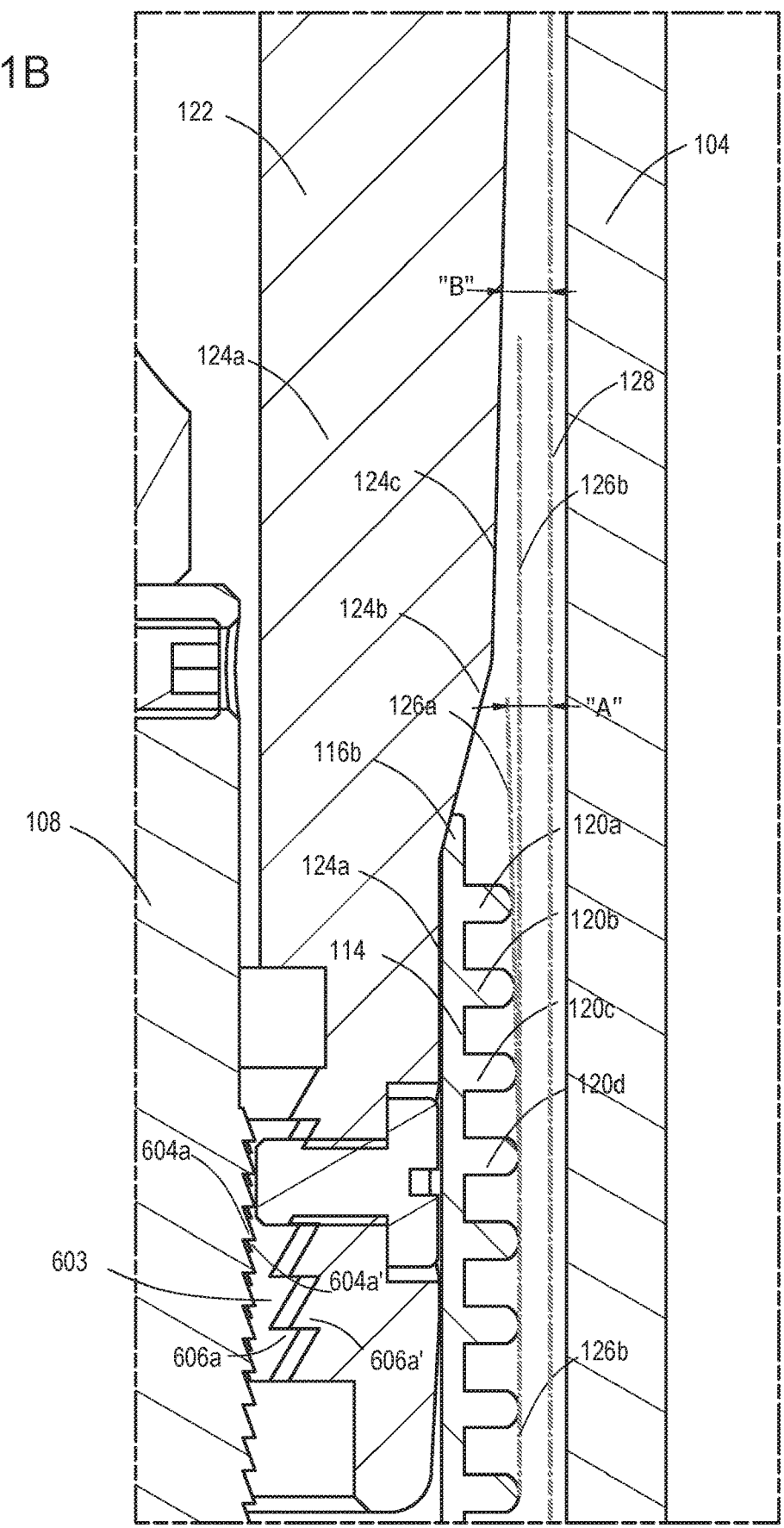
FIG. 1B illustrates a cross-sectional close-up view of a swage coupled to a shaft via a lock ring.

FIG. 1B illustrates a cross-sectional close-up view of a swage 122 coupled to a shaft 108 via lock ring 603. A lower portion of the swage may be disposed in a plug 114. The shaft 108, the plug 114, and the swage 122 are each cylindrical. The shaft 108, the plug 114, and the swage 122 are concentric, that is, the shaft 108 is partially disposed inside swage 122 and the swage 122 is partially disposed inside the upper plug portion of the plug 114. Accordingly, the shaft 108, the plug 114, and the swage 122 share a central axis.

The shaft portion has shaft teeth 604a extending outwardly from an outer surface of the shaft portion. The shaft teeth 604a are abutted against inner lock teeth 604a' that extend from an inner surface of the lock ring 603. The inner lock teeth 604a' extend inwardly from the inner surface of the lock ring 603, e.g., towards the central axis of the lock ring 603. In other words, the tapered surfaces of the shaft teeth 604a may be slid over the tapered surfaces of the lock teeth 604a'. Thus, the lock ring 603 may be pushed and or slid downwardly relative to the shaft 108 but not upwardly relative to the shaft 108.

Additionally, the lock ring 603 has outer lock threads 606a abutted against inner swage threads 606a'. Accordingly, in some cases, the lock 603 is inhibited from movement relative to the swage 122. Correspondingly, the swage 122 may be pushed downwardly but not upwardly relative to the shaft 108 because the lock ring 603 is downwardly slidable on the shaft 108 but is fixedly coupled to the swage 122.

Any swage 122 used in any patch plug assembly 100 referenced herein preferably is cylindrical with at least three different cylindrical surfaces 124a-c, which are adjoining as shown in the drawings and are actually sub-parts of the overall outer surface of the swage 122 and thus each swage surface 124 can also be considered a sub-surface. Preferably the three swage surfaces 124a-c include a middle surface 124b located between an upper surface 124c and a lower surface 124a, where the middle surface 124b preferably extends from the upper surface 124c to the lower surface 124a, as depicted in the drawings. The upper swage surface 124c is part of the swage 122 with a larger diameter than the diameter of the lower swage surface 124a, which is smaller. Thus, the upper swage surface 124c is closer to the inner surface of the tubular 104 than the lower swage surface 124a, and the middle surface 124b tapers from the upper surface 124c to the lower surface 124c, so that, being cylindrical, the middle surface 124b is frustroconical and the upper surface 124c also is, preferably, also frusto-conical although having a smaller angle from the central axis as illustrated in the drawings. In the specific version shown in the drawings, the swage 122 has a first swage portion proximate the upper end that has a first swage surface 124a, a second swage surface 124b, and third swage surface 124c.

The first swage surface 124a preferably extends from the lower end of the swage 122 to the point where the second swage surface 124b begins and is preferably parallel to the central axis of swage 122. However, in some versions, the first swage surface 124a can be slightly non-parallel to the central axis, i.e., being disposed at a slight angle.

The second swage surface 124b preferably adjoins and extends from the first swage surface 124a although it is also possible for one or more other surfaces to be present between the first swage surface 124a and second swage surface 124b. The second swage surface 124b in the illustrated version extends at an acute angle relative to the central axis, e.g., 8, 9, 10, 11, 12, 13, 14, or 15 degrees.

The third swage surface 124c preferably adjoins and extends from the second swage surface 124b although it is also possible for one or more other surfaces to be present between the second swage surfaces 124b and third swage surface 124c. The third swage surface 124c in the illustrated version extends at an acute angle relative to the central axis, which is an angle preferably less than the angle between the first and second swage surfaces, e.g., 1, 1.5, 2, 3, 4, or 5 degrees.

The upper plug portion 116b of the plug 114 has a plurality of the ribs 120. Each rib 120 protrudes radially outwardly from the axis of the plug 114 and can be regarded as being part of the outer surface of the plug 114. Preferably, each rib 120 extends in a direction that is perpendicular to the central axis of the plug 114, and as depicted in the drawings, some of the ribs are not perpendicular to the portion of the plug surface between the ribs.

An important aspect of the ribs is how their tips are aligned with respect to each other and the remaining non-rib outer surface of the plug 114. Each rib 120 preferably has a radiused, e.g., rounded, end with a tip at the portion of each rib end that is farthest from the central axis of the plug 114. Of the plurality of ribs, four ribs 120a-d, which are the ribs on the upper plug portion 116b of the plug 114, have radiused ends with tips sharing a first tangent line 126a.

The remaining ribs have radiused ends with tips sharing a second tangent line 126b. The first tangent line 126a is acute with respect to the second tangent line 126b. The first tangent line 126a and the second tangent line 126b intersect at an acute angle, e.g., 1, 1.5, 2, 3, 4 or 5 degrees (angle "A" in FIG. 1B). The first tangent line 126a and the second tangent line 126b preferably intersect proximate the tip of one of the intermediate ribs, e.g., at the fourth rib 120d as depicted in FIG. 1B. The first tangent line 126a is at an angle to the second tangent line 126b because the ribs 120a-d have varying radii. For example, the rib 120b has a radius greater than that of the rib 120a. The rib 120c has a radius greater than that of the rib 120b. The rib 120d has a radius greater than that of the rib 120d.

The first tangent line 126a and the third swage surface 124c extend at acute angles relative to a line 128. The line 128 is parallel to the central axis of the plug 114 and the swage 122. Also, the line 128 is parallel to the second tangent line 126b. Furthermore, the line 128 is parallel to an inner surface of a tubular 104. As shown in FIG. 1B, the line 128 forms an angle A with the first tangent line 126a. Additionally, the line 128 forms an angle B with the third swage surface 124c. The angle A and the angle B are congruent.

Figure 2:
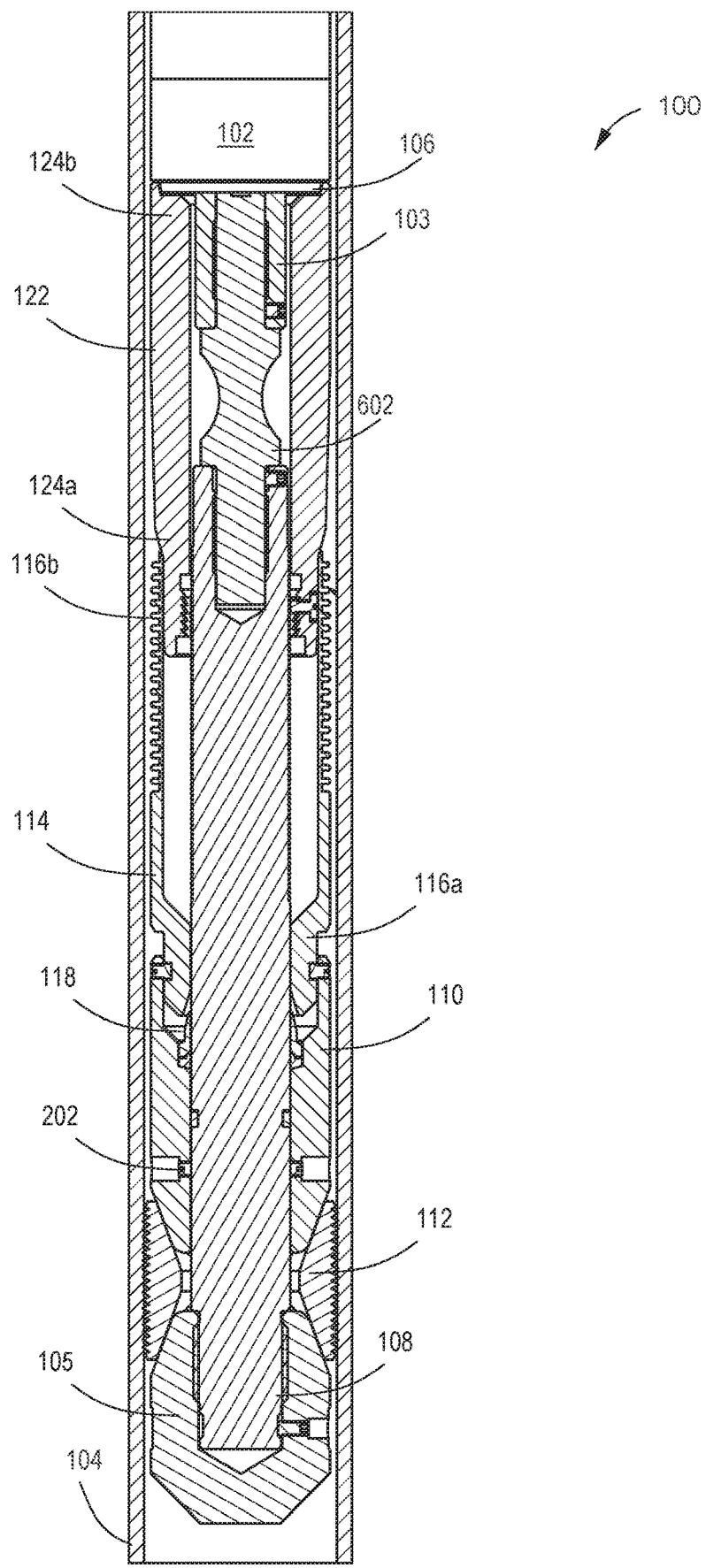
FIG. 2 illustrates a cross-sectional view of a patch plug assembly in an anchor configuration.

FIG. 2 illustrates a cross-sectional view of a patch plug assembly 100 in an anchor configuration. In the anchor configuration, a rod 103 has been activated to pull, e.g., in an upward direction, a shaft 108, which extends through and/or along the axis that is shared in common by a swage 122, a plug 114, and a wedge 110. When pulled, the shaft 108 is moved relative to the swage 122, the plug 114, and the wedge 110.

Shear pins 202 coupled to the shaft 108 and the wedge 110 (see FIG. 1) are broken (sheared off) when the swage 122, plug 114, and wedge 110 are pushed a sufficient distance relative to the shaft 108 (see FIG. 2.) Each of the shear pins 202 are configured, sized, and/or shaped to break when a pre-determined force, e.g., ranging from 1,440-1,600 lbf (6,400-7,100 N), is applied thereto in a direction perpendicular to the central axis of the pin. Accordingly, when sufficient force, e.g., 30,000 lbf (133,400 N) or more, is transferred to the pins via downward movement of the swage 122, the plug 114, and the wedge 110, the shear pins 202 would break.

Additionally, a tapered surface of the wedge 110 is pushed against a tapered surface of the slip 112, as seen in FIG. 2. As a result, the slip 112 is pushed outwardly against an inner surface of the tubular 104. Moreover, in the anchor configuration, the teeth of the slip 112 are abutted against the inner surface of the tubular 104.

Figure 3A:
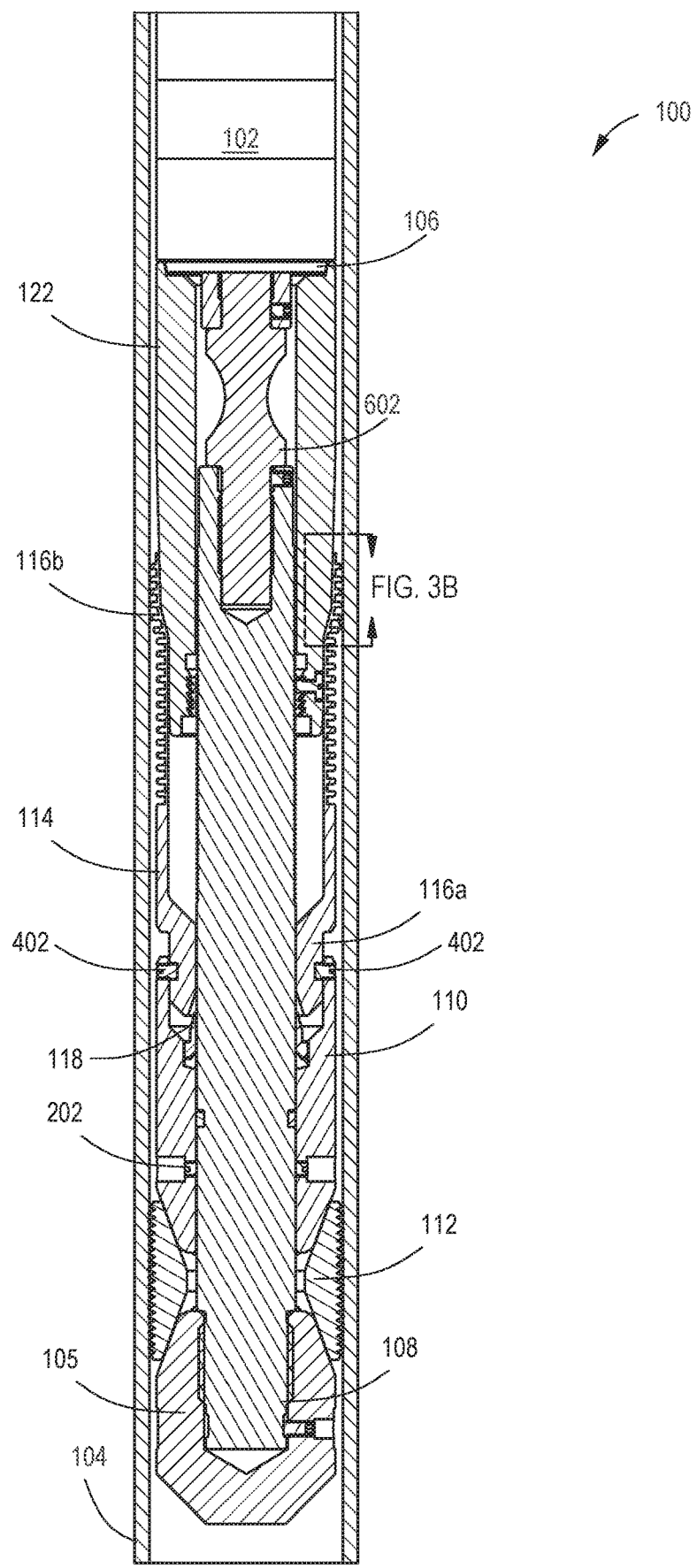
FIG. 3A illustrates a cross-sectional view of a patch plug assembly in a plug-alignment configuration.
Figure 3B:
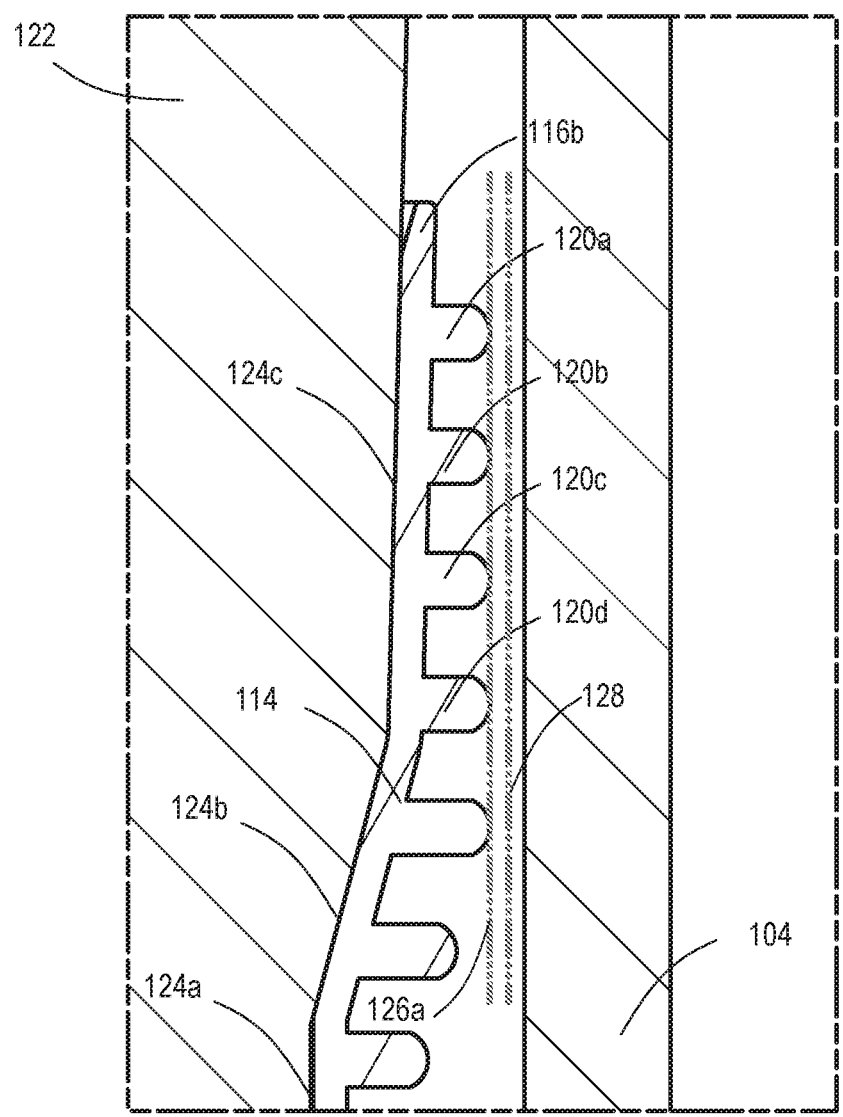
FIG. 3B illustrates a cross-sectional view of a plug having ribs sharing a tangent line parallel to an inner surface of a tubular.

FIG. 3A illustrates a cross-sectional view of a patch plug assembly 100 in a plug-alignment configuration, in which ribs 120a-d of a plug are aligned with an inner surface of a tubular 104. FIG. 3B illustrates a cross-sectional view of a plug 114 having ribs 120a-d with tips sharing a tangent line 126a that is parallel to an inner surface of a tubular 104.

Referring to FIGS. 3A-B, in a plug-alignment configuration, a piston 106 has been activated to push, e.g., in a downward direction, the swage 122, the plug 114, and the wedge 110 in a tubular 104. When pushed, the swage 122, the plug 114, and the wedge 110 are moved relative to the shaft 108, which extends through and along the central axis shared by the swage 122, the plug 114, and the wedge 110.

Because the slip 112 is abutted against an inner surface of the tubular 104, the shaft 108 remains substantially stationary as the swage 122, the plug 114, and the wedge 110 are pushed by the piston 106 so that the patch plug assembly 100 moves into the anchor configuration.

In the plug-alignment configuration, swage surfaces 124a-c of the swage 122 are disposed in an upper plug portion 116b of a plug 114, and the smooth inner surfaces of a portion of the plug 114 slide over the smooth outer surface of a portion of the swage 122. For example, the upper plug portion 116b of the plug 114 is slid over each of the swage surfaces 124a-c of the swage 122.

Additionally, a lock ring 603 coupled to the swage 122 and the shaft 108 inhibits the swage 122 from moving upward relative to the shaft 108. The lock ring 603 has outer lock threads 606a abutted against inner swage threads 606a'. Moreover, the lock ring 603 has inner lock threads 604a abutted against outer shaft threads 604a'. The threads of the lock ring 603, the shaft 108 and the swage 122 are configured so that the lock ring 603 can be pushed downwardly but not moved upwardly relative to the shaft 108.

As depicted in FIGS. 3A and 3B, the walls of the plug 114 are deformed outward when the swage 122 is pushed axially down the center of the plug 114, and the inner diameter of the plug 114, specifically, including the upper portion 116b, expands to conform to the outer diameter of the upper portion of the swage 122. For such expansion to occur, the plug should be made of material that is sufficiently soft or malleable to make the plug expandable. Accordingly, plug 114 preferably has a Brinell hardness value less than that of the swage 122. Thus, when sufficient force, e.g., 30,000 lbf (133,400 N) or more, is applied via the piston 106 to the swage 122, the swage surfaces 124a-c would push the upper plug portion 116b outwardly towards an inner surface of a tubular 104, as depicted in FIG. 3B.

The swage surface 124c is abutted against the upper plug portion 116b of the plug 114. Additionally, the outer swage surface 124c pushes against the inner surface of the upper portion 116b which pushes the four ribs 120a-d towards an inner surface of the tubular 104. However, in some configurations of the patch plug assembly, e.g., in the anchor configuration depicted in FIG. 2, the ribs 120a-d are not in physical contact with the inner surface of the tubular 104. Preferably, in the sealing-aligning configuration, the ribs 120a-d share a tangent line 126a that is parallel with the inner surface of the tubular 104.

Figure 4A:
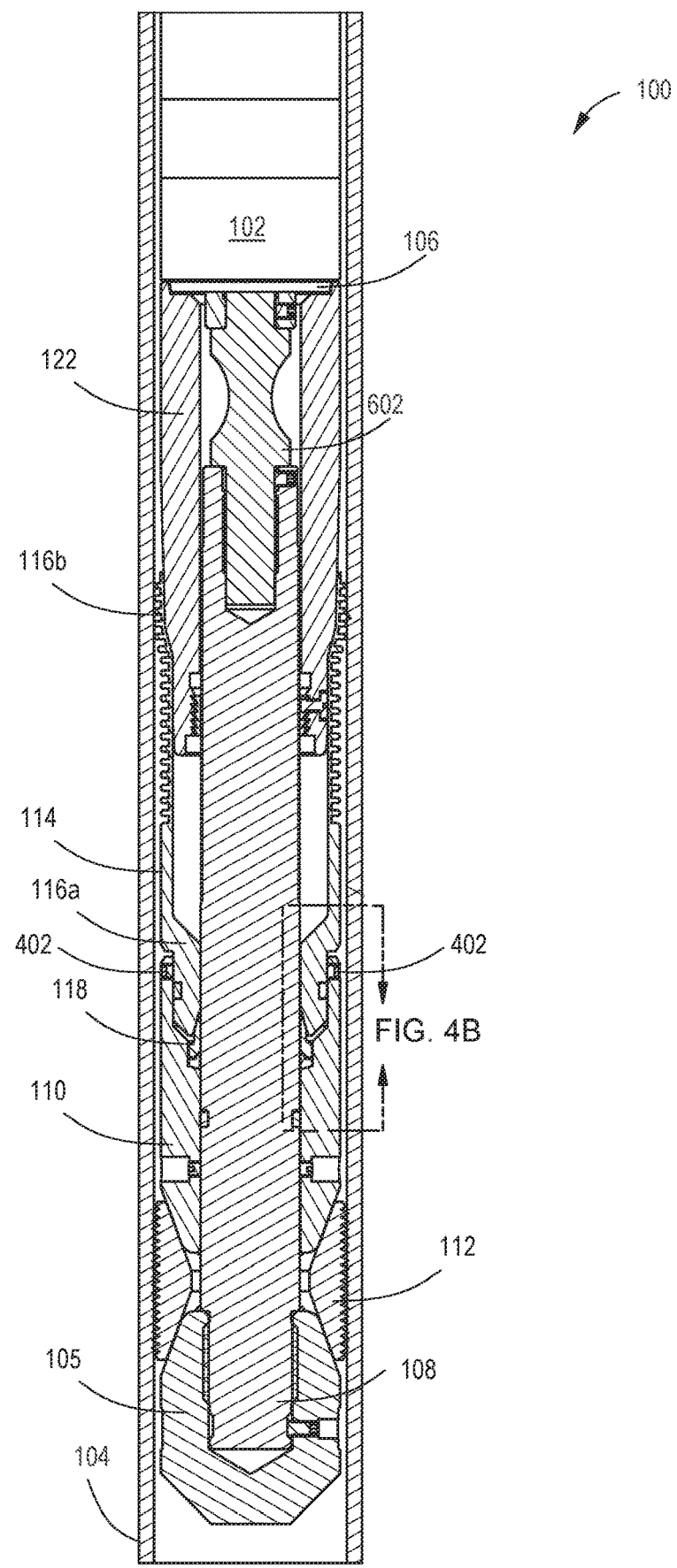
FIG. 4A illustrates a cross-sectional view of a patch plug assembly in a sealing configuration using ferrule.
Figure 4B:
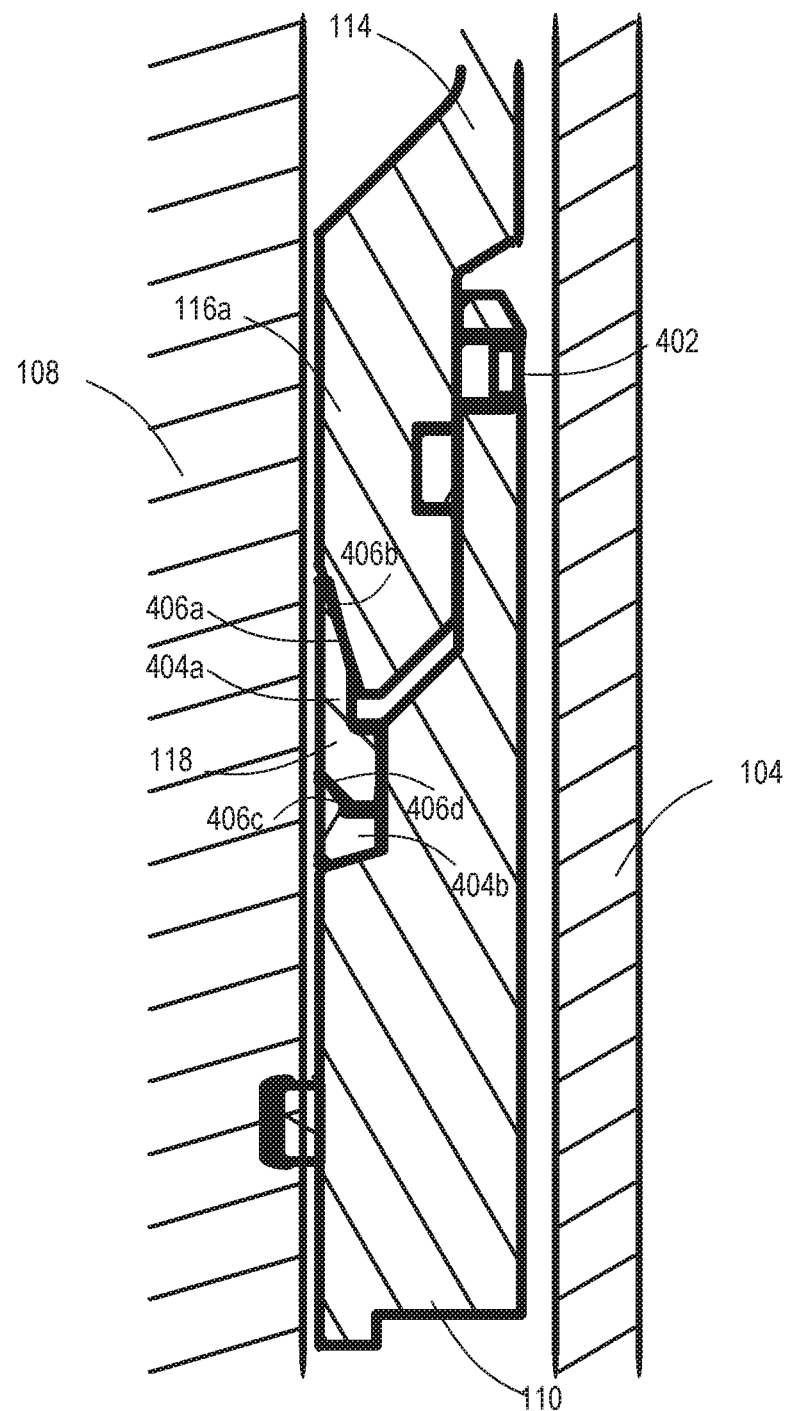
FIG. 4B illustrates a cross-sectional close-up view of a patch plug assembly in a sealing configuration a using ferrule.

FIG. 4A illustrates a cross-sectional view of a patch plug assembly 100 having a ferrule 118 sealingly coupled to a plug 114. FIG. 4B illustrates a cross-sectional close-up view of a ferrule 118 sealingly coupled to a plug 114.

Continuing from the discussion of FIGS. 3A-B above, referring now to FIGS. 4A-B, when sufficient force, e.g., 30,000 lbf (133,400 N) or more, is applied to the piston 106, the piston 106 would push the swage 122 and the plug 114 down relative to the wedge 110 and ferrule 118. The wedge 110 would be inhibited from movement when it is abutted against a slip 112 that is abutted laterally against an inner surface of the tubular 104

When the swage 122 and the plug 114 are pushed downward relative to the wedge 110, the shear pins 402 coupled to the wedge 108 and the swage 122 are broken. The shear pins 402 are configured, sized, and/or shaped to break when sufficient force, e.g., 1,440-1,600 lbf (6,400-7,100 N), is applied thereto. Thus, the applied force transferred from the swage 122 to the plug 114 to the shear pins 402 would cause the shear pins 402 to break, as shown in FIG. 4A.

When the shear pins 402 break, thus no longer supporting the plug 114 on an upper portion of an upper portion of the wedge 110, the lower plug portion 116a of the plug 114 is slid down relative to upper portion of the wedge 110. The lower plug portion 116a would be pushed against the ferrule 118. The ferrule 118 is disposed in an opening of the wedge 110 and abutted against an upper end of the wedge 110.

Referring to FIG. 4B, the ferrule 118 includes an upper ferrule portion 404a and a lower ferrule portion 404b. The upper ferrule portion 404a preferably has a tapered upper end 406a. The tapered upper end 406a is received in a lower plug portion 116a of the plug 114. An outer surface of the tapered upper end 406a is abutted against an inner surface of a tapered lower end 406b of the plug portion 116a. The outer surface of the tapered upper end 406a may be in physical contact with the inner surface of the tapered lower end 406b.

The upper ferrule portion 404a and a lower ferrule portion 404b of the ferrule 118 are preferably constructed from certain sufficiently malleable material, e.g., metal, elastomer, PEEK, silicone, or rubber. Thus, when sufficient force, e.g., 30,000 lbf (133,400 N) or more, pushes the plug 114 downward against the upper ferrule portion 404a, a portion of the upper ferrule portion 404a would be deformed against the plug 114. Accordingly, deformation of the upper ferrule portion 404a may cover and/or fill microscopic gaps between the plug 114 and the shaft 108, gaps between the upper ferrule portion 404a and the plug 114, and/or gaps between the upper ferrule portion 404a and the wedge 110.

As it is being pushed by the plug 114, the upper ferrule portion 404a would push against the lower ferrule portion 404b. When sufficient force is applied to the upper ferrule portion 404a and the upper ferrule portion 404a, a portion of the upper ferrule portion 404a and a portion of the lower ferrule portion 404b would be deformed against each other. Accordingly, deformation of the portions may cover and/or fill microscopic gaps therebetween.

Also, as it is being pushed by the upper ferrule portion 404a, the lower ferrule portion 404b would be pushed against the wedge 110. When sufficient force, e.g., 30,000 lbf (133,400 N) or more, is applied to the lower ferrule portion 404b, a portion of the lower ferrule portion 404b would be deformed against the wedge 110. Accordingly, deformation of the portion of the lower ferrule portion 404b may cover and/or fill microscopic gaps between lower ferrule portion 404b and wedge 110. Furthermore, deformation of the portion of the lower ferrule portion 404b may cover and/or fill microscopic gaps between the lower ferrule portion 404b and shaft 108 and/or gaps between the lower ferrule portion 404b and the wedge 110.

Advantageously, as a consequence of their malleability, the deformed upper ferrule portion 404a and deformed lower ferrule portion 404b tend to be more likely to inhibit fluid from passing between the ferrule 118 and the plug 114, between ferrule 118 and the shaft 108, and/or between ferrule 118 and the wedge 110. In other words, in some cases, the deformed ferrule portions 404a, 404b may inhibit fluid from ingress from the lower plug portion 116a into an upper plug portion 116b of the plug 114.

Figure 4C:
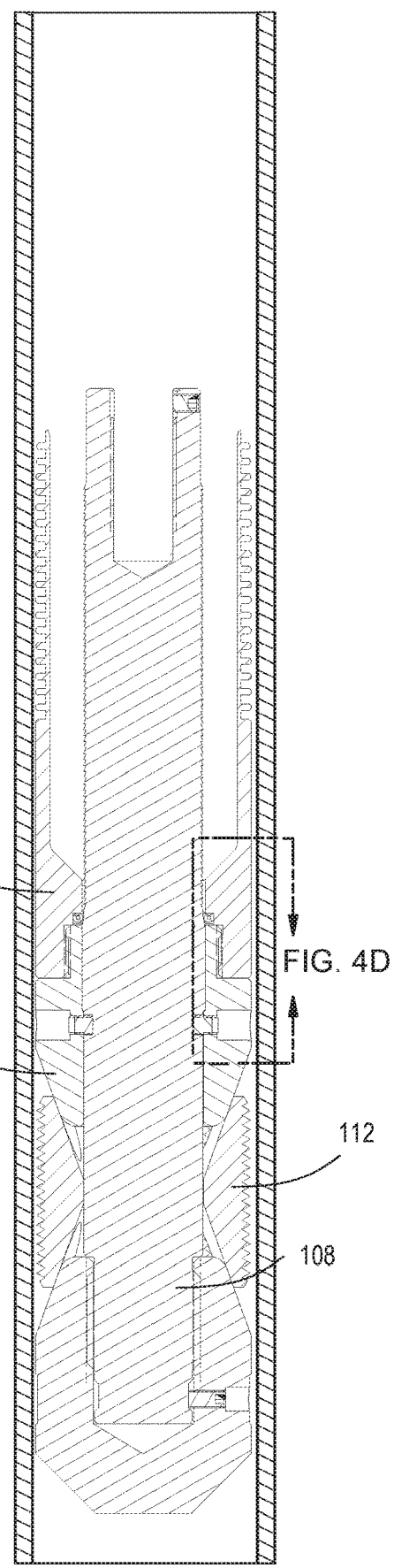
FIG. 4C illustrates a cross-sectional view of a patch plug assembly in a sealing configuration a using ring.
Figure 4D:
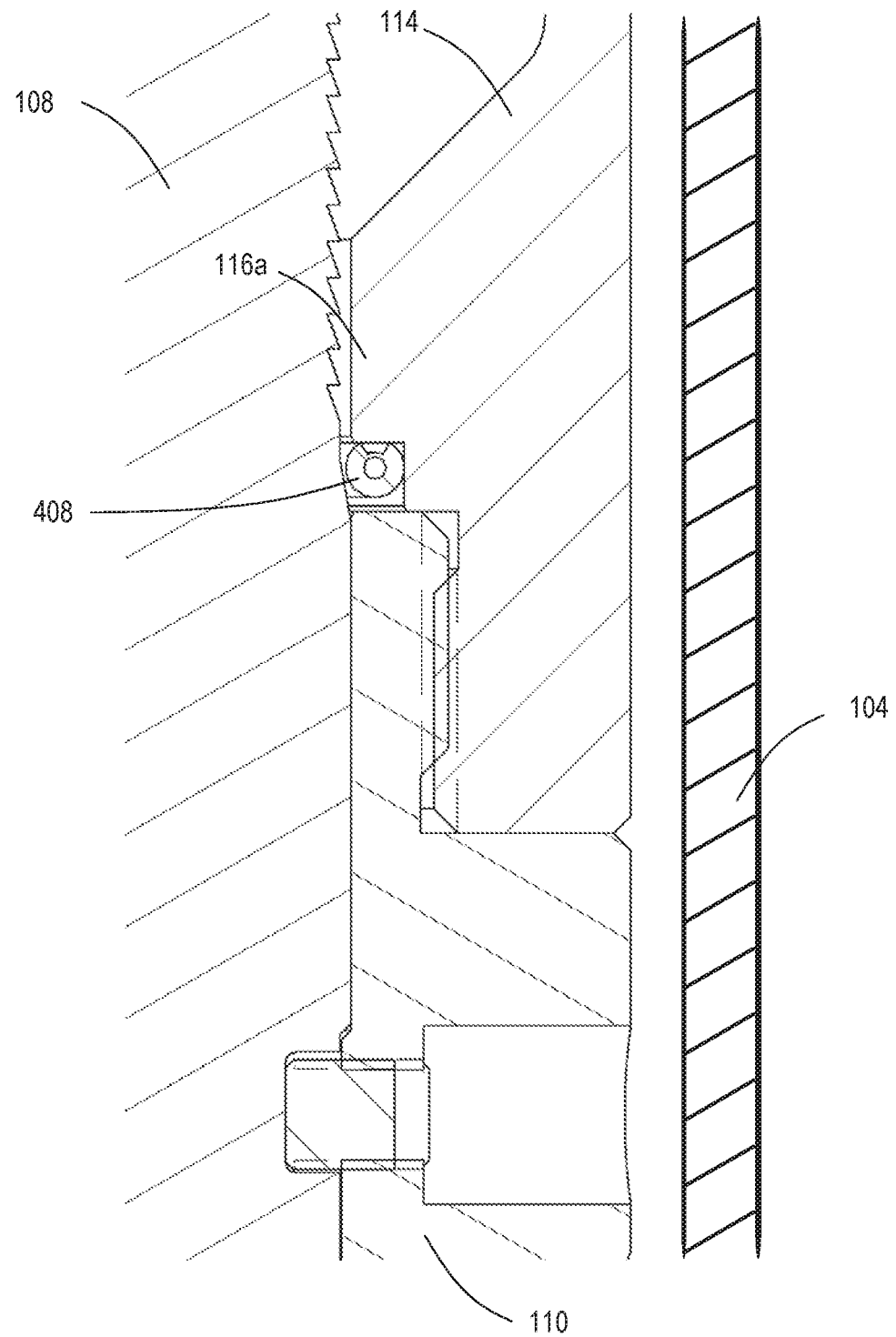
FIG. 4D illustrates a cross-sectional close-up view of a patch plug assembly in a sealing configuration a using ring.

Alternatively, referring to FIGS. 4C-D, a seal ring 408 is used to inhibit fluid from passing between the shaft 108 and the wedge 110, between the wedge 110 and the plug 114, and/or between all three. The seal ring 408 may be deformable, e.g., malleable and/or resilient. The seal ring 408 may be made from rubber, plastic, or metal. The seal ring 408 is disposed around the shaft 108. The seal ring 408 is disposed above a face of the wedge 110. The seal ring 408 is disposed below a face of the plug 114. Also, the ring 408 is disposed within a groove of the plug 114.

The wedge 110 is coupled to shaft 108, e.g., via shear pins. The plug 114 has a lower end coupled, e.g., via threads, to an upper end of the wedge 110. Once the shaft 108, the wedge 110, and the plug 114 are coupled, portions of the shaft 108, the wedge 110, and/or the plug 114 would press and deform the seal ring 408. Accordingly, deformation of the seal ring 408 may cause one or more portions of the seal ring 408 to cover and/or fill gaps between the shaft 108, the wedge 110, and the plug 114. Moreover, the one or more portions of the seal ring 408 would be abutted against surfaces of the shaft 108, the wedge 110, and the plug 114. Thus, the deformed seal ring 408 may inhibit fluid from passing between the shaft 108 and the wedge 110, between the wedge 110 and the plug 114, and/or between all three.

Figure 5:
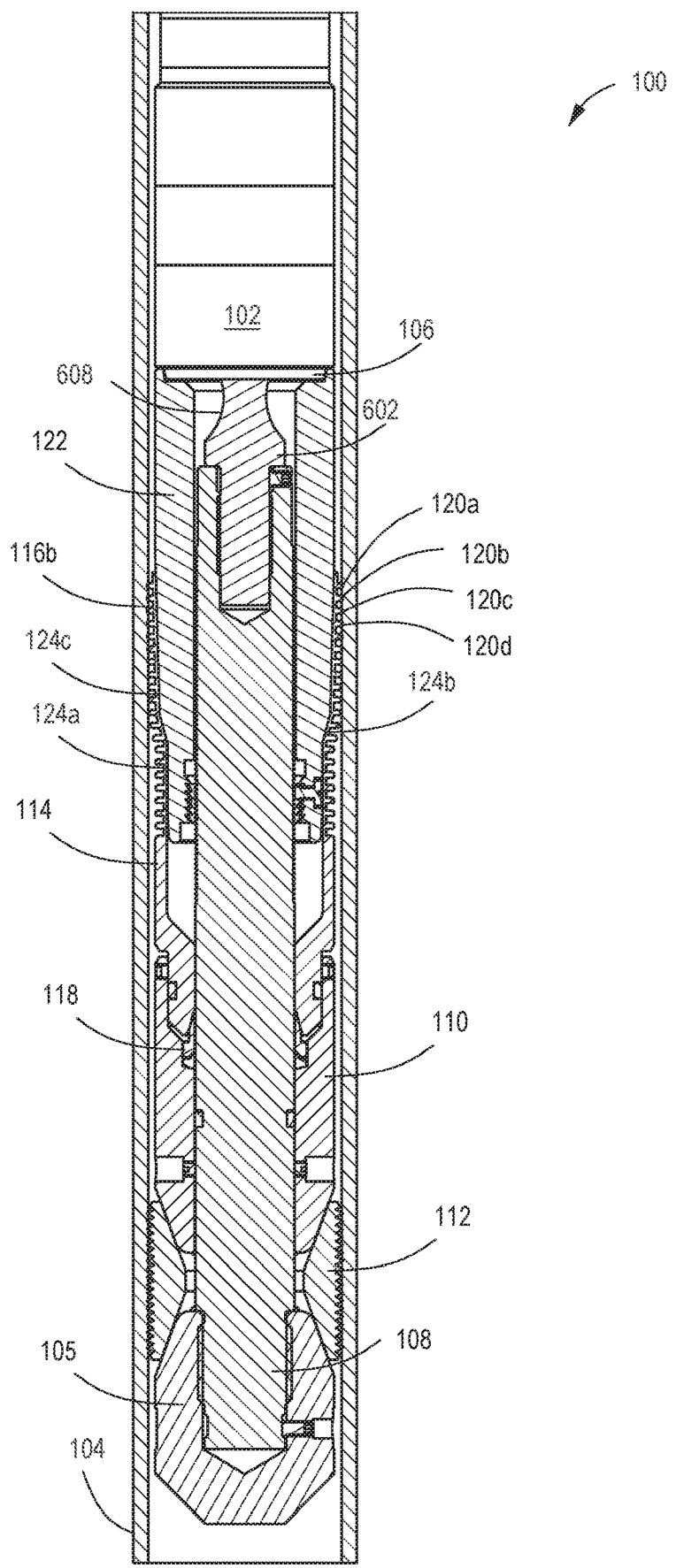
FIG. 5 illustrates a cross-sectional view of a patch plug assembly a swedge configuration.

FIG. 5 illustrates a cross-sectional view of a patch plug assembly 100 in a swedge configuration. In the swedge configuration, swage surfaces 124a-c of a swage 122 are disposed farther down in a plug 114, as compared to how they are disposed in FIG. 3A. The ribbed portion of the plug 114 is configured, sized, and shape to deform outwardly by a pre-determined force, e.g., ranging from 13,000 to 20,000 lbf (57,800-88,900 N), applied thereto. When sufficient force, e.g., 30,000 lbf (133,400 N) or more, is applied via a piston 106 to the swage surfaces 124a-c, the swage surfaces 124a-c would be pushed pass a rib 120d of the plug 114.

Moreover, in the swedge configuration, swage surface 124c of the swage 122 is pushed passed any rib 120 of the plug 114 (including ribs 120a-d), the swage surface 124c also pushes the rib 120 outwardly against an inner surface of a tubular 104. The pushed rib 120 is abutted against the inner surface of the tubular 104.

The ribs 120 are preferably part of the plug 114, and thus the ribs 120 are preferably formed from the same malleable material, e.g. metal, elastomer, silicone, or rubber, as the plug 114, having a particular malleability. For example, the ribs 120 have, or comprise a material having, a hardness value less than the hardness value of the tubular 104. Thus, force ranging from 13,000 to 20,000 lbf (57,800-88,900 N) or more pushing the ribs 120 against the tubular 104 would cause the ribs 120 to deform against the tubular 104. Deformation of the ribs 120 may cover and/or fill gaps between the plug 114 and the tubular 104. Thus, in some cases, the deformed ribs 120 may inhibit fluid from ingress through the plug 114 and the tubular 104. In other words, in some cases, the deformed ribs 120 may inhibit fluid from ingress between an upper plug portion 116b of the plug 114 and the tubular 104.

Figure 6:
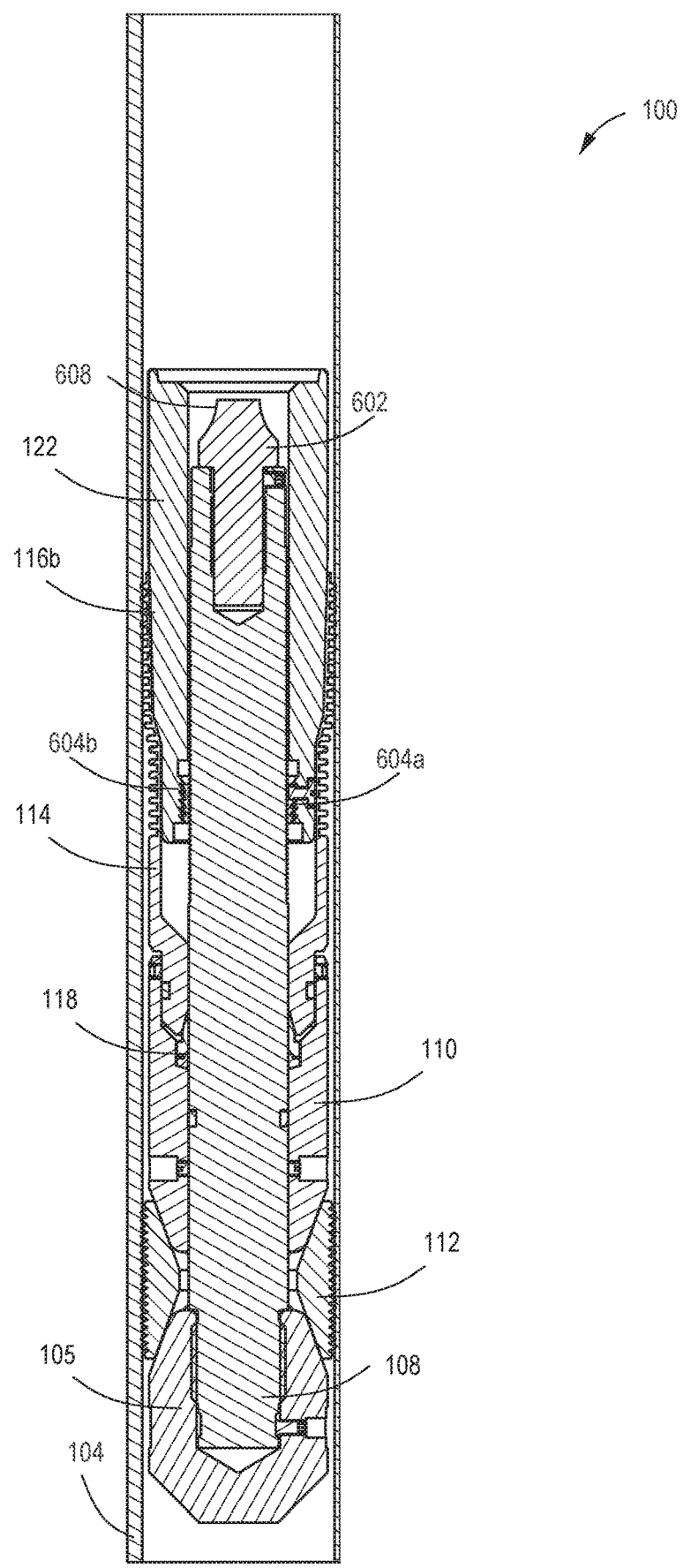
FIG. 6 illustrates a cross-sectional view of a patch plug assembly in a release configuration.

FIG. 6 illustrates a cross-sectional view of a patch plug assembly 100 in a release configuration. In the release configuration, a stud 602 of a shaft 108 is uncoupled from a rod 103 of a setting tool 102. The stud 602 has a thin stud portion 608. The thin stud portion 608 has a diameter less than that of the shaft 108. The thin stud portion 608 is configured, sized, and/or shaped to break by a pre-determined force, e.g., greater than 30,000 lbf (133,400 N), applied thereto. Preferably, a force greater than 30,000 lbf (133,400 N) transferred from the swage 122 to the stud 602 would cause the thin stud portion 608 to break.

When the stud 602 is broken, the setting tool 102 is uncoupled from the shaft 108. Thus, the setting tool 102 can be pulled away from shaft 108 and the swage 122.

The views of FIGS. 7A-F illustrate a sequence of steps for coupling a plug 114 of a patch plug assembly 100 to a tubular 104, e.g., casing, drill pipe, or riser. The views of FIG. 1-6 correspond to the views of FIGS. 7A-B. The patch plug assembly 100 may be coupled to a line, e.g., wireline, coil tubing, or slick line, and "tripped" downhole inside the tubular 104. The line may transfer electrical power from the surface to electronic components, e.g., motor and sensors, on a setting tool 102 coupled to a shaft 108 of the patch plug assembly 100 to operate. The components may be communicatively coupled to an electronic controller (not shown), e.g., processor board. The electronic controller may cause the components to perform certain actions, e.g., turning on and/or off, rotating, and pushing and/or pulling. The electronic controller may receive coded instructions via the line from the operator at the surface.

Referring to FIG. 7A and FIGS. 1A-B, the patch plug assembly 100 is delivered to a pre-determined location in the tubular 104, in a run-in configuration.

Once the patch plug assembly 100 reaches the pre-determined location in the tubular 104, the operator may send instructions to a setting tool 102 to actuate the patch plug assembly 100, e.g. via a motor or a gas-powered pyrotechnic charge (not shown). The setting tool 102 may simultaneously 1) push, e.g., via a piston 106, a swage 122, a plug 114, and a swedge 110 with downward force greater than 30,000 lbf (133,400 N) and 2) pull, e.g., via a rod 103, on a shaft 108 with upward force greater than 30,000 lbf (133,400 N). The upward force may cause the rod 103, a stud 606, a shaft 108, and a knob 105 to move, e.g., displaced, upwards. The downward force may cause the swage 122, the plug 114, and the wedge 110 to move, e.g., displaced, downward. In other words, the rod 103, the stud 606, the shaft 108, and the knob 105 would be moved axially relative to the swage 122, the plug 114, and the wedge 110.

Additionally, the actuation force applied may also cause various components of the patch plug assembly 100 or portions of the components to become deformed.

The sequence of deformation and/or movement of the various components of the patch plug assembly 100 may depend on the components' relative ability to withstand forces applied thereto. For example, between the plug 114 (which may withstand applied force up to 11,500 lbf before deforming) and the wedge 110 held to the shaft 108 by a shear pin 202 (which may withstand applied force up to 1,440 lbf), the wedge 110 would be moved before the plug 114 becomes deformed because the shear pin 202 can resist less force than the plug 114. Thus, the sequence of deformations and/or movements of the components of the patch plug assembly 100 are based on their relative resistance to force. Actions performed corresponding to the sequence of deformation and/or movement are: 1) anchoring slips 112 to set the patch plug assembly 100 in an anchor configuration, 2) pushing ribs 102a-d outward to set the patch plug assembly 100 in a plug-alignment configuration 3) deforming a ferrule 118, 4) deforming ribs of the plug 114 to set the patch plug assembly 100 in a swedge configuration, and 5) breaking a stud 602.

Referring to FIG. 7B and FIG. 2, the setting tool 102 may cause the rod 103 to pull the stud 106. The stud 606 is coupled to the shaft 108. Therefore, pulling the rod 103 also pulls on the shaft 108. At the same time, the setting tool 102 may also push on the swage 122 and the wedge 110. The wedge 110 is coupled to the shaft 108 via shear pins 202. The shear pins 202 are configured, sized, and/or shaped to break under force ranging from 1,440-1,600 lbf (6,400-7,100 N). Thus, upon receiving force, e.g., 30,000 lbf (133,400 N) or more, from the setting tool 102, the shear pins 202 would break first relative to other components of the patch plug assembly 100 that are capable of resisting force applied by the setting tool 102. Once the shear pins 202 are broken, the knob 105 may be pulled up. An upper surface of the pulled knob 105 may be pushed against slip 112 couple to the shaft 108.

The knob 105 has a tapered upper surface pushing against a tapered surface of the slip 112. Thus, the pulled tapered upper surface knob 105 would push the slip 112 radially outwardly towards a first inner surface of the tubular 104. Teeth on the slip 112 may be abutted against the inner surface of the tubular 104. The abutted teeth may, in some cases, inhibit downward and/or upward movement of the slip 112 relative to the tubular 104, setting the patch plug assembly 100 in an anchor configuration.

Referring to FIG. 7C and FIGS. 3A-B, after the patch plug assembly 100 is set in the anchor configuration, the pushed swage 122 may further push downwardly on the plug 114, relative to the shaft 108.

The force applied against the swage 122 may cause a swage surface 124c of the swage 122 to push four ribs 120a-d on an upper plug portion 116b of the plug 114 outwardly towards a second inner surface of the tubular 104.

Although the upper plug portion 116b may push against the swage 122, a lock ring 603 coupled to the swage 122 and the shaft 108, in some cases, may inhibits the swage 122 from moving upward relative to the plug 110. The lock ring 603 has outer lock threads 606a abutted against inner swage threads 606a'. Moreover, the lock ring 603 has inner lock threads 604a abutted against outer shaft threads 604a'. The threads of the lock ring 603, the shaft 108, and the swage 122 are configured so that the lock ring 603 can be pushed downwardly but not moved upwardly relative to the shaft 108.

As discussed above concerning the plug-alignment configuration, prior to actuating the setting tool 102, the ribs 120a-d have radiused ends with tips sharing a first tangent line 126a. The remaining ribs on the plug 114 having radiused ends with tips sharing a second tangent line 126b. The first tangent line 126a and central axis line of the swage 122 intersect at an acute angle, e.g., 1, 1.5, 2, 3, 4, or 5 degrees.

The first tangent line 126a and a surface of a third swage surface 124c of the swage 122 have respective acute angles, relative to the central axis of the swage 122, that are congruent. The acute angles face in opposite directions of each other.

After actuating the setting tool 102 and when the four ribs 120a-d are abutted against the surface of the third swage surface 124c, the first tangent line 126a is substantially parallel to the second inner surface of the tubular 104. Preferably, the ribs 120a-d are not in physical contact with the second inner surface of the tubular 104. Accordingly, the patch plug assembly 100 is now set in a plug-alignment configuration.

Next, referring to FIG. 7D and FIGS. 4A-B, the applied force may cause the shear pins 402, coupling the wedge 110 to the plug 114, to break. The shear pins 402 are configured, sized, and/or shaped to withstand force ranging from 11,500-12,800 lbf before breaking. Once the shear pins 402 are broken, the plug 114 is pushed down against a ferrule 118 coupled to the wedge 110.

Where the ferrule 118 is constructed from a material softer than a material of the plug 114, the applied force pushing the plug 114 against the ferrule 118 may cause the ferrule 118 to deform against lower plug portion 116a of the plug 114. Deformation of the ferrule 118 may cover and/or fill gaps between the plug 114 and the shaft 108. Therefore, in some cases, the deformed ferrule 118 may inhibit fluid from ingress through the plug 114. In other words, in some cases, the deformed ferrule 118 may inhibit fluid from ingress into the lower plug portion 116a, between the plug 114 and the shaft 108, into an upper plug portion 116b of the plug 114. Conversely, in some cases, the deformed ferrule 118 may inhibit fluid from ingress from the upper plug portion 116b, between the plug 114 and the shaft 108, into the lower plug portion 116a.

Referring to FIG. 7E and FIG. 5, after the plug 114 and the ferrule 118 are sealingly coupled, the swage 122 may cause the swage surface 124c of the swage 122 to move down relative to the four ribs 102a-d of the plug 114. As discussed above concerning the plug-alignment configuration, because the ribs 102a-d has the first tangent line 126a parallel to the second inner surface of the tubular 104, the swage surface 124c may push the four ribs 120a-d simultaneously against the second inner surface of the tubular 104. Pushing the ribs 120a-d simultaneously may advantageously provide for even distribution of force to the ribs 120a-d.

The pushed ribs 120a-d may be abutted against the second inner surface of the tubular 104. The abutted ribs 120a-d may deform simultaneously against the tubular 104. Simultaneous deformation of the ribs 120a-d with even distribution of force against the ribs 120a-d may advantageously provide for even spreading of deformed material of the ribs 120a-d against the second inner surface of the tubular 104.

The deformed ribs 120a-d may cover and/or fill gaps between the plug 114 and the tubular 104. Thus, in some cases, the deformed ribs 120a-d may inhibit fluid from ingress through the plug 114 and the tubular 104. In other words, in some cases, the deformed ribs 120 may inhibit fluid from ingress from a lower plug portion 116a pass an upper plug portion 116b of the plug 114. Conversely, in some cases, the deformed ribs 120 may inhibit fluid from ingress from the upper plug portion 116b pass the lower plug portion 116a.

Additionally, the swage surface 124c may be pushed farther downward against additional ribs. Each rib 120 pushed by the swage surface 124c against may be deformed against the tubular 104. Thus, the tubular 104 is fluidically sealed below and/or above the deformed ribs. The patch plug assembly 100 is now set in a swedge configuration.

After the tubular 104 has been sealed, referring to FIG. 7F and FIG. 6, the shaft 108 and the stud 602 may still be pulled by the setting tool 102.

The stud 602 has a thin stud portion 608. The thin stud portion 608 is configured, sized, and/or shaped to break when force is applied thereto by the setting tool 102. Thus, the upward force, e.g., 30,000 lbf (133,400 N) or more, applied to the stud 602 would cause the thin stud portion 608 to break.

When the stud 602 is broken, the setting tool 102 is uncoupled from the shaft 108. Thus, the operator may retrieve the setting tool 102 from downhole by pulling it away from the shaft 108 and the swage 122.

What is claimed as the invention is:

1. A method of sealing a tubular, comprising:
providing a patch plug assembly, comprising:
a shaft;
a knob coupled to the shaft;
a wedge coupled to the shaft;
a slip coupled to the shaft;
a plug coupled to the wedge; and
a ferrule disposed between the wedge and the plug;
pushing, with the wedge and the knob, the slip against the tubular, wherein the wedge pushes the slip in a first direction and the knob pushes the slip in a second direction opposite the first direction;
pushing the plug against the ferrule after the slip is pushed against the tubular;
pushing the ferrule against the wedge after the plug is pushed against the ferrule, wherein the ferrule seals against the shaft and the plug; and
pushing a plug portion of the plug against an inner surface of the tubular.

2. The method of claim 1, further comprising deforming the ferrule against the plug after the plug is pushed against the ferrule.

3. The method of claim 1, further comprising sealingly coupling the ferrule to the plug after the plug is pushed against the ferrule.

4. The method of claim 1, further comprising deforming the ferrule against the wedge after the ferrule is pushed against the wedge.

5. The method of claim 1, further comprising sealingly coupling the ferrule to the wedge after the ferrule is pushed against the wedge.

6. The method of claim 1, sealingly coupling the ferrule to the shaft after the plug is pushed against the ferrule.

7. The method of claim 1, wherein the plug portion is pushed outwardly with a swage.

8. The method of claim 1, further comprising pushing, with a swage, a first portion of the plug against the wedge and a second portion of the plug against the ferrule.

9. The method of claim 1, further comprising pushing a portion of the plug against an inner surface of the tubular after the ferrule, the wedge, and the plug are coupled.

10. The method of claim 1, wherein a portion of the slip is disposed between the wedge and the knob.

11. The method of claim 1, wherein the wedge and the knob push the slip simultaneously.

12. The method of claim 1, wherein the wedge is moved in a first direction and the knob is moved in a second direction opposite the first direction.

13. A method of sealing a tubular, comprising:
providing a patch plug assembly, comprising:
a shaft;
a knob coupled to the shaft;
a wedge coupled to the shaft;
a slip coupled to the shaft;
a plug coupled to the shaft, the plug having:
a first protrusion having a first radius; and
a second protrusion having a second radius shorter than the first radius; and
a swage having a first swage surface and a second swage surface;
pushing, with the wedge and the knob, the slip against the tubular, wherein the wedge pushes the slip in a first direction and the knob pushes the slip in a second direction opposite the first direction;
sealingly coupling the wedge to the plug;
pushing, with the first swage surface, the first protrusion, and the second protrusion to share a tangent line parallel with a tubular surface of the tubular.

14. The method of claim 13, further comprising pushing, with the second swage surface, the first protrusion and the second protrusion against the tubular surface after the first protrusion and the second protrusion are pushed by the first swage surface.

15. The method of claim 13, further comprising simultaneously pushing, with the second swage surface, the first protrusion and the second protrusion against the tubular surface.

16. The method of claim 13, further comprising deforming the first protrusion and the second protrusion against the tubular surface.

17. The method of claim 13, further comprising simultaneously deforming the first protrusion and the second protrusion against the tubular surface.

18. The method of claim 13, further comprising sealingly coupling the first protrusion against the tubular surface.

19. The method of claim 13, further comprising sealingly coupling the second protrusion against the tubular surface.

20. The method of claim 13, further comprising pushing, with the swage, the first protrusion and the second protrusion so the tangent line is parallel with tubular surface after the wedge and the plug are coupled.

* * * * *